United States Patent
Dutta et al.

(10) Patent No.: US 12,193,002 B2
(45) Date of Patent: Jan. 7, 2025

(54) TECHNIQUES FOR SIDELINK COMMUNICATION USING ASSISTING DEVICE

(71) Applicant: QUALCOMM Incorporated, San Diego, CA (US)

(72) Inventors: Sourjya Dutta, San Diego, CA (US); Kapil Gulati, Belle Mead, NJ (US); Shuanshuan Wu, San Diego, CA (US); Junyi Li, Fairless Hills, PA (US); Navid Abedini, Basking Ridge, NJ (US); Anantharaman Balasubramanian, San Diego, CA (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 17/645,167

(22) Filed: Dec. 20, 2021

(65) Prior Publication Data
US 2023/0199767 A1     Jun. 22, 2023

(51) Int. Cl.
*H04W 72/12*     (2023.01)
*H04B 7/155*     (2006.01)
*H04W 16/26*     (2009.01)
*H04W 72/20*     (2023.01)
*H04W 72/23*     (2023.01)

(52) U.S. Cl.
CPC ........ *H04W 72/20* (2023.01); *H04B 7/15507* (2013.01); *H04W 16/26* (2013.01); *H04W 72/23* (2023.01)

(58) Field of Classification Search
CPC ..... H04W 72/12; H04W 72/04; H04W 72/20; H04W 72/51; H04W 72/25; H04W 72/54; H04W 72/23; H04W 72/14; H04W 16/26; H04W 76/14; H04W 76/34; H04W 76/15; H04W 76/11; H04B 7/15; H04L 1/20; H04L 25/02; H04L 5/00; H04L 1/18; H04L 12/24; H04L 41/06
USPC ........................................................ 370/315
See application file for complete search history.

(56) References Cited

U.S. PATENT DOCUMENTS

| | | | |
|---|---|---|---|
| 11,638,197 B1 * | 4/2023 | Pan ....................... | H04W 76/30 370/315 |
| 11,653,349 B2 * | 5/2023 | Ryu ..................... | H04B 7/0452 370/329 |
| 11,665,769 B2 * | 5/2023 | Pan ....................... | H04W 76/19 455/11.1 |
| 11,700,045 B2 * | 7/2023 | Abedini ................ | H04L 5/0082 370/329 |
| 11,838,964 B2 * | 12/2023 | Kuo ........................ | H04W 76/34 |
| 2021/0250749 A1 * | 8/2021 | Cheng ................... | H04W 8/005 |

(Continued)

*Primary Examiner* — Man U Phan
(74) *Attorney, Agent, or Firm* — Dalei Dong; Harrity & Harrity, LLP

(57) ABSTRACT

Various aspects of the present disclosure generally relate to wireless communication. In some aspects, a wireless communication device may receive, from a base station, information associated with training or configuring an assisting device to provide assistance for a unicast link of a user equipment (UE). The wireless communication device may train the assisting device based at least in part on the information associated with the training or configuring the assisting device. Numerous other aspects are described.

28 Claims, 11 Drawing Sheets

(56) References Cited

U.S. PATENT DOCUMENTS

| | | | |
|---|---|---|---|
| 2022/0007445 A1* | 1/2022 | Pan | H04W 40/22 |
| 2022/0321203 A1* | 10/2022 | Raghavan | H04B 7/1555 |
| 2023/0217517 A1* | 7/2023 | Kuo | H04W 76/14 |
| | | | 370/315 |
| 2024/0031006 A1* | 1/2024 | Elshafie | H04B 7/0695 |

* cited by examiner

TECHNIQUES FOR SIDELINK COMMUNICATION USING ASSISTING DEVICE

FIELD OF THE DISCLOSURE

Aspects of the present disclosure generally relate to wireless communication and to techniques and apparatuses for sidelink communication using an assisting device.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless communication device. The method may include receiving, from a base station, information associated with training or configuring an assisting device to provide assistance for a unicast link of a user equipment (UE). The method may include training the assisting device based at least in part on the information associated with the training or configuring the assisting device.

Some aspects described herein relate to a method of wireless communication performed by a base station. The method may include receiving, from a UE, an indication of a sidelink link quality associated with the UE. The method may include identifying a wireless communication device to provide assistance for a unicast link of the UE using an assisting device. The method may include transmitting, to the wireless communication device, information associated with training or configuring the assisting device to provide the assistance for the UE. The method may include transmitting, to the UE, information associated with the wireless communication device.

Some aspects described herein relate to a wireless communication device for wireless communication. The wireless communication device may include a memory and one or more processors coupled to the memory. The one or more processors may be configured to receive, from a base station, information associated with training or configuring an assisting device to provide assistance for a unicast link of a UE. The one or more processors may be configured to train the assisting device based at least in part on the information associated with the training or configuring the assisting device.

Some aspects described herein relate to a base station for wireless communication. The base station may include a memory and one or more processors coupled to the memory. The one or more processors may be configured to receive, from a UE, an indication of a sidelink link quality associated with the UE. The one or more processors may be configured to identify a wireless communication device to provide assistance for a unicast link of the UE using an assisting device. The one or more processors may be configured to transmit, to the wireless communication device, information associated with training or configuring the assisting device to provide the assistance for the UE. The one or more processors may be configured to transmit, to the UE, information associated with the wireless communication device.

Some aspects described herein relate to a non-transitory computer-readable medium that stores a set of instructions for wireless communication by a wireless communication device. The set of instructions, when executed by one or more processors of the wireless communication device, may cause the wireless communication device to receive, from a base station, information associated with training or configuring an assisting device to provide assistance for a unicast link of a UE. The set of instructions, when executed by one or more processors of the wireless communication device, may cause the wireless communication device to train the assisting device based at least in part on the information associated with the training or configuring the assisting device.

Some aspects described herein relate to a non-transitory computer-readable medium that stores a set of instructions for wireless communication by a base station. The set of instructions, when executed by one or more processors of the base station, may cause the base station to receive, from a UE, an indication of a sidelink link quality associated with the UE. The set of instructions, when executed by one or more processors of the base station, may cause the base station to identify a wireless communication device to provide assistance for a unicast link of the UE using an assisting device. The set of instructions, when executed by one or more processors of the base station, may cause the base station to transmit, to the wireless communication device, information associated with training or configuring the assisting device to provide the assistance for the UE. The set of instructions, when executed by one or more processors of the base station, may cause the base station to transmit, to the UE, information associated with the wireless communication device.

Some aspects described herein relate to an apparatus for wireless communication. The apparatus may include means for receiving, from a base station, information associated with training or configuring an assisting device to provide assistance for a unicast link of a UE. The apparatus may include means for training the assisting device based at least in part on the information associated with the training or configuring the assisting device.

Some aspects described herein relate to an apparatus for wireless communication. The apparatus may include means for receiving, from a UE, an indication of a sidelink link quality associated with the UE. The apparatus may include means for identifying a wireless communication device to provide assistance for a unicast link of the UE using an assisting device. The apparatus may include means for transmitting, to the wireless communication device, information associated with training or configuring the assisting device to provide the assistance for the UE. The apparatus may include means for transmitting, to the UE, information associated with the wireless communication device.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
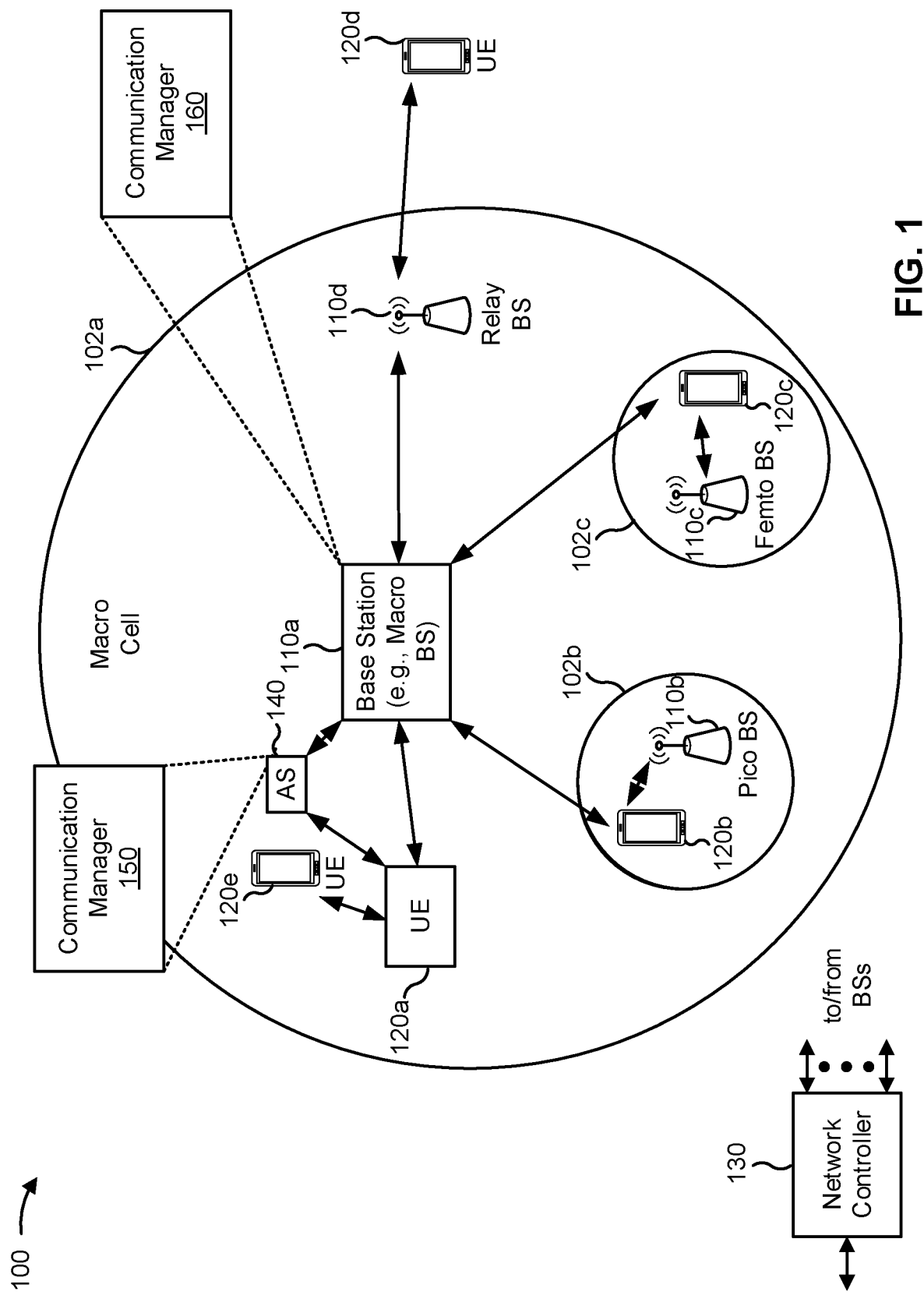
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110. In some aspects, an assisting system (AS) 140 may relay or reflect transmissions between UEs 120 or between a UE 120 and a base station 110. The AS 140 is described in more detail in connection with FIG. 5.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless communication device (such as AS 140) may include a communication manager 150. As described in more detail elsewhere herein, the communication manager 150 may receive, from a base station, information associated with training or configuring an assisting device to provide assistance for a unicast link of a UE; and train the assisting device based at least in part on the information associated with the training or configuring the assisting device. Additionally, or alternatively, the communication manager 150 may perform one or more other operations described herein.

In some aspects, the base station 110 may include a communication manager 160. As described in more detail elsewhere herein, the communication manager 160 may receive, from a UE, an indication of a sidelink link quality associated with the UE; identify a wireless communication device to provide assistance for a unicast link of the UE using an assisting device; transmit, to the wireless communication device, information associated with training or configuring the assisting device to provide the assistance for the UE; and transmit, to the UE, information associated with the wireless communication device. Additionally, or alternatively, the communication manager 160 may perform one or more other operations described herein.

As indicated above, FIG. 1 is provided as an example. Other examples may differ from what is described with regard to FIG. 1.

Figure 2:
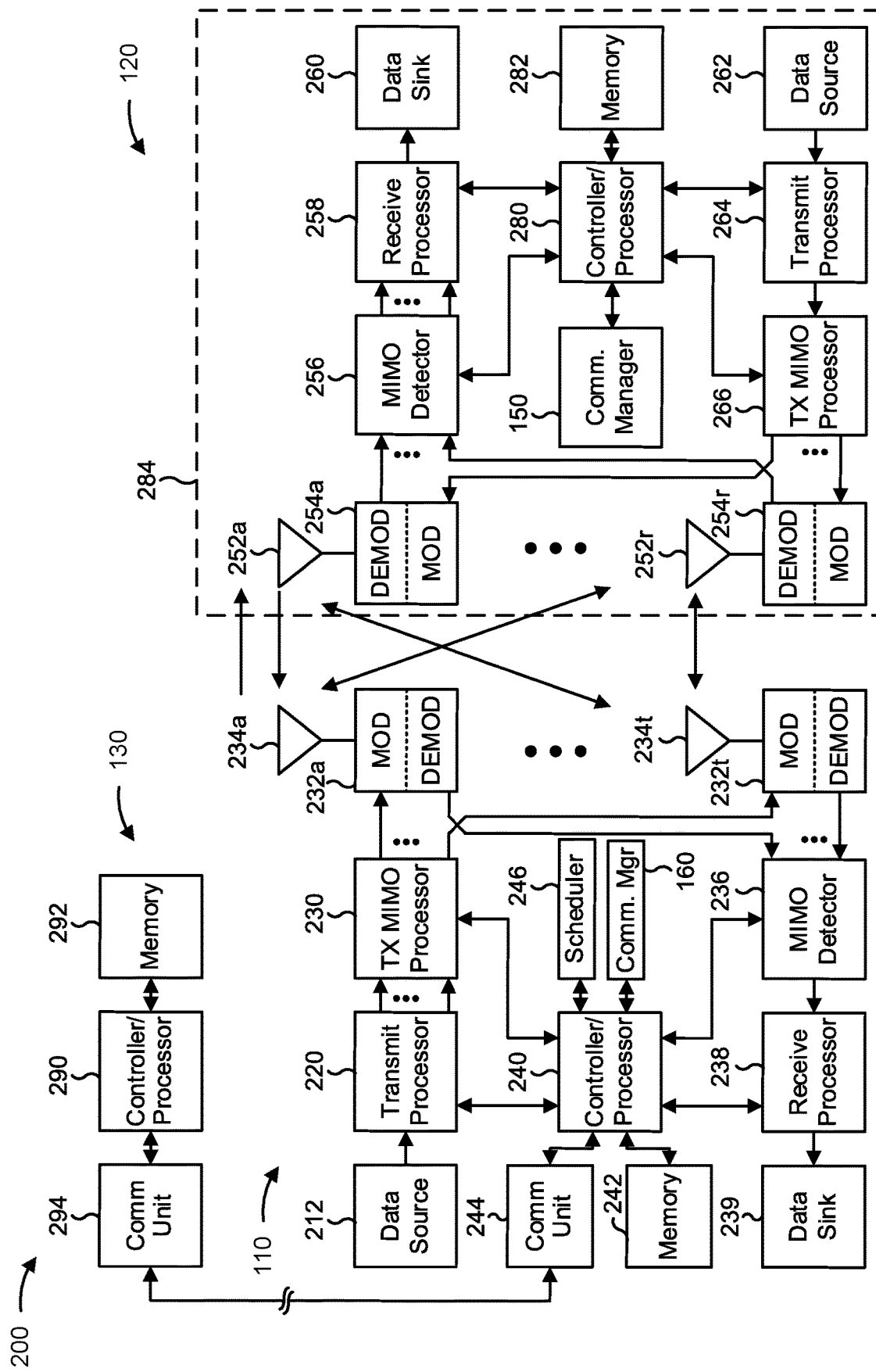
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, and/or any other component(s) of FIG. 2 may perform one or more techniques associated with providing assistance on a sidelink, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the assisting system 140 (e.g., a wireless communication device of the assisting system 140) may include a communication manager 150. As described in more detail elsewhere herein, the communication manager 150 may receive, from a base station, information associated with training or configuring an assisting device to provide assistance for a unicast link of a user equipment (UE); and train the assisting device based at least in part on the information associated with the training or configuring the assisting device. Additionally, or alternatively, the communication manager 150 may perform one or more other operations described herein.

In some aspects, the base station 110 may include a communication manager 160. As described in more detail elsewhere herein, the communication manager 160 may receive, from a user equipment (UE), an indication of a sidelink link quality associated with the UE; identify a wireless communication device to provide assistance for a unicast link of the UE using an assisting device; transmit, to the wireless communication device, information associated with training or configuring the assisting device to provide the assistance for the UE; and transmit, to the UE, information associated with the wireless communication device. Additionally, or alternatively, the communication manager 160 may perform one or more other operations described herein.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
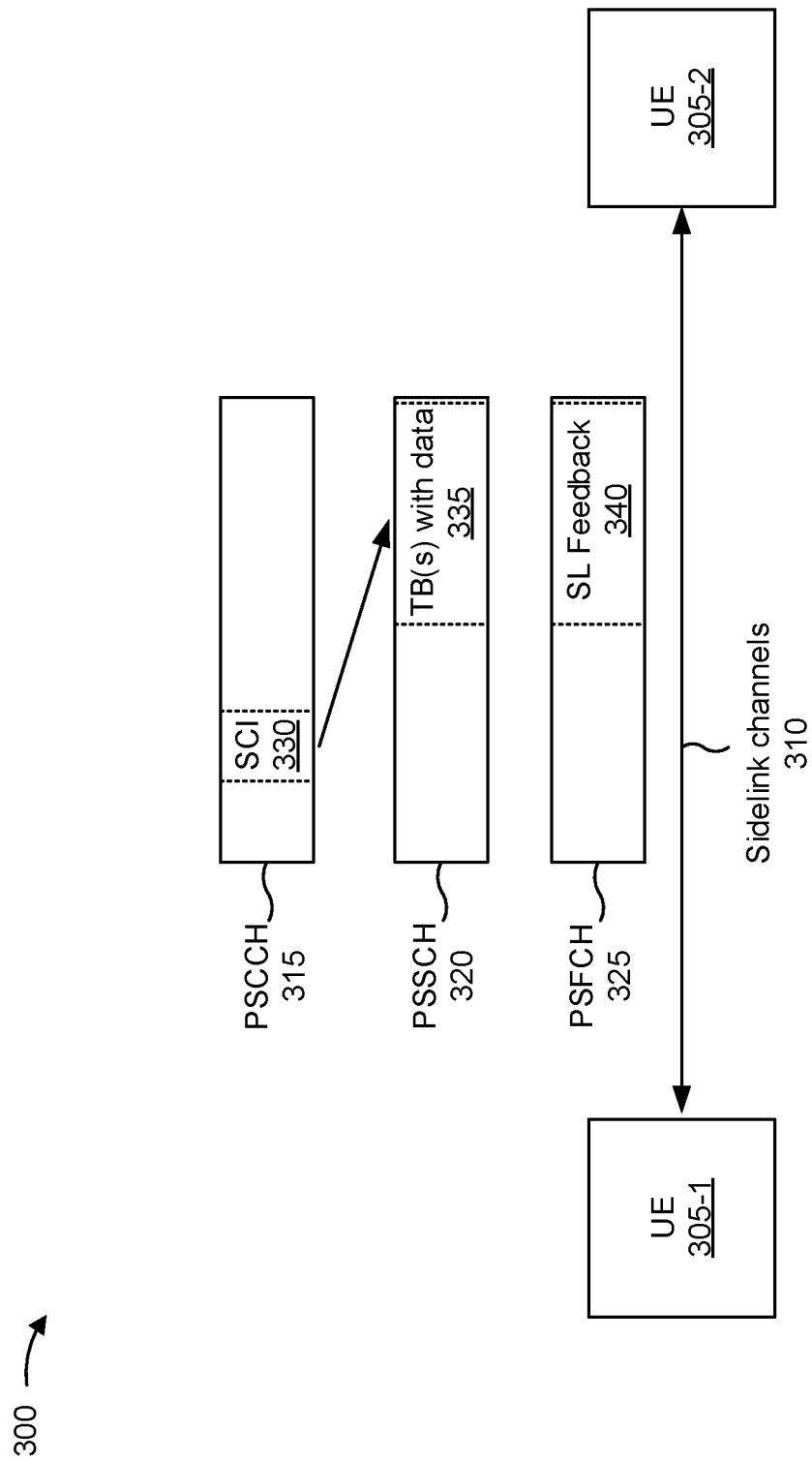
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
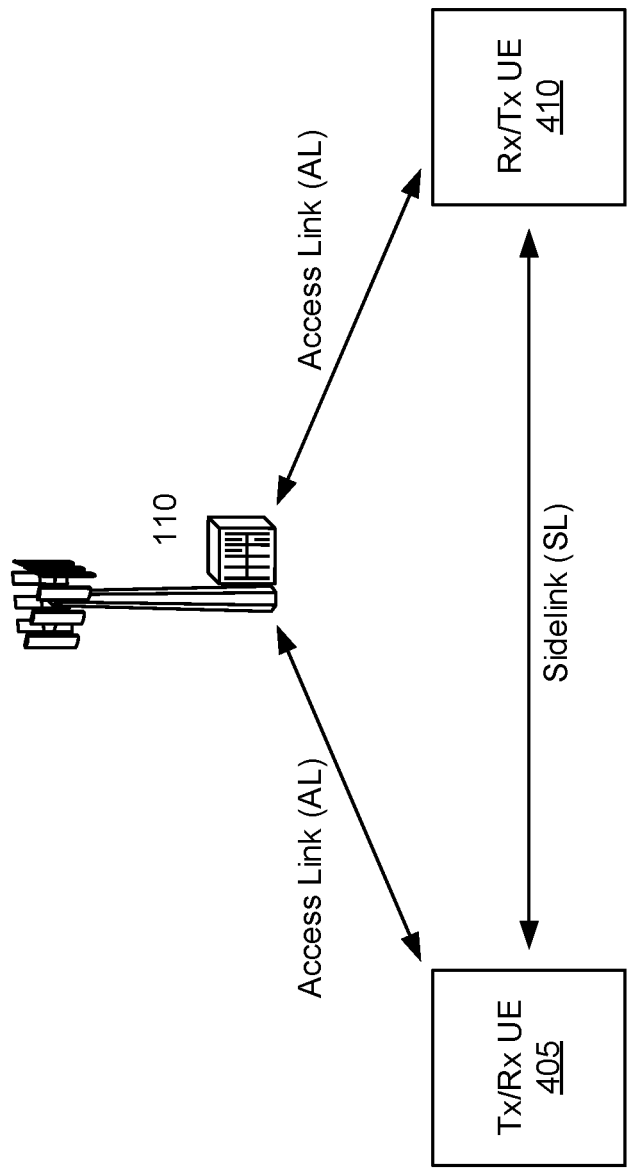
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
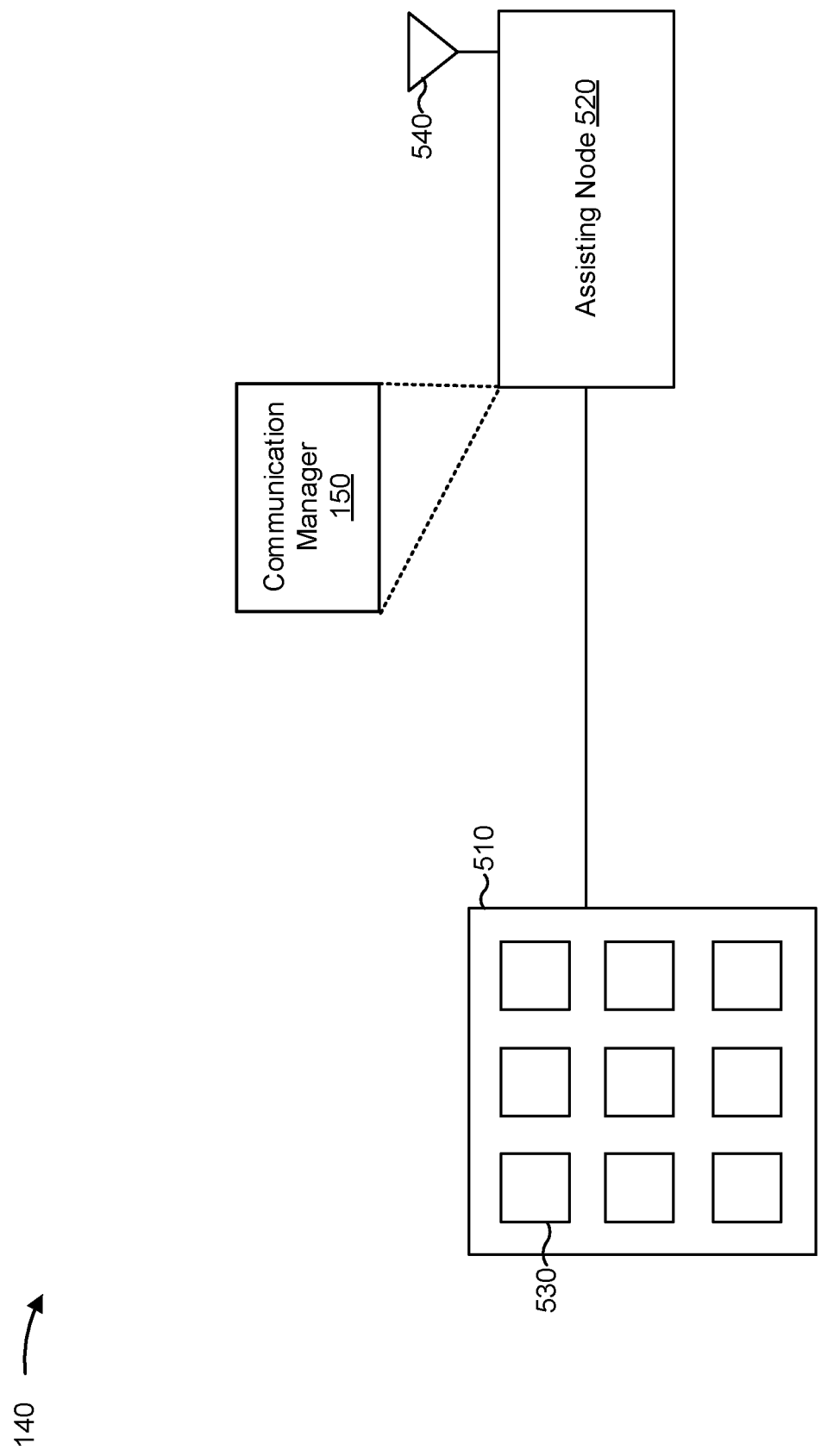
FIG. 5 is a diagram illustrating an assisting device and an assisting node, collectively shown in FIG. 1 as assisting system, in accordance with the present disclosure.

FIG. 5 is a diagram illustrating an assisting device 510 and an assisting node 520, collectively shown in FIG. 1 as assisting system 140, in accordance with the present disclosure. In some aspects, the assisting system 140 may be referred to as a wireless communication device. In some other aspects, the assisting node 520 may be referred to as a wireless communication device. In other words, "wireless communication device" can refer to an assisting node, an assisting device, an assisting system, or a combination thereof. In some aspects, the assisting system 140 may include a passive or near passive device, such as a RIS, a channel engineering device (CED), a configurable deflector, or the like. It should be understood that references herein to a RIS can also apply to other types of passive or near passive devices. In some aspects, a RIS may relay (e.g., reflect) transmissions between base stations and/or UEs via one or more reflective elements 530. In some implementations, RISs are passive devices. Therefore, RISs may be associated with little to no power consumption, thereby improving power efficiency of the network. In some aspects, the assisting device 510 may be an active antenna unit, such as a repeater, a relay, or the like.

A RIS may reflect RF signals (e.g., an impinging wave) incident on the assisting device 510. The reflective property of a RIS may be used to relay the RF signals from a transmitting device to a receiving device. Thus, a RIS may be used to increase throughput, improve beamforming gain, and circumvent obstructions to increase a quantity of UEs that can be served by the network. A direction (such as an angle of reflection, and sometimes referred to herein as a link direction) and phase of the reflection of the RF signals can be controlled by a set of reflective elements 530. Nine reflective elements 530 are shown in FIG. 5, though the RIS can include any number of reflective elements. The RIS may be said to be "reconfigurable" because a phase and/or angle of reflection of signals incident on each of the reflective elements 530, and therefore an accumulative phase and/or angle of reflection of RF signals incident on the RIS, may be selectively adjustable. In particular, a precoder configuration (e.g., reflection matrix configuration) associated with the RIS may include a set of precoders associated with the set of reflective elements 530, where each reflective element 530 is associated with a respective precoder.

In some aspects, the RIS may be associated with a set of precoder configurations, where each precoder configuration may be represented by a vector r including a quantity of terms $r_i$ representing precoders or reflective coefficients, and where i is equivalent to a quantity of reflective elements 530 of the RIS. In other words, a vector r for a RIS including nine reflective elements 530 (e.g., i=9) may include nine terms (e.g., $r_1$ through $r_9$). Due to the fact that the RIS includes a passive device which does not perform any signal amplification, each term $r_i$ may include a complex number satisfying $|r_i| \leq 1$. In some aspects, the vector r may be used to generate a diagonal matrix R, in which the diagonal elements of R include the terms $r_i$ of the vector r. In some aspects, the diagonal matrix R may be referred to as a precoder matrix of the RIS. A precoder matrix (e.g., for a given UE 120 or a given direction), which may be referred to herein as a reflective matrix, is represented by the symbol φ. −φ (negative phi) indicates a reflective matrix with a phase rotation of π radians. The reflective matrix for a given UE 120 or a given direction may be obtained by configuration of the RIS (such as by the base station 110) and/or by training. A reflective matrix may be referred to herein as a configuration matrix.

In some aspects, the phase and/or angle of reflection for each reflective element 530 may be adjusted by adjusting a resistance, a reactance, or both, of each respective reflective element 530. Accordingly, a precoder associated with each reflective element 530 may include a set of parameters associated with the reflective element 530, including an orientation of the reflective element 530, a resistance and/or reactance of the reflective element 530, or any combination thereof. In this regard, the RIS may be configured (by the assisting node 520) to modify an angle of reflection of signals incident on the RIS based at least in part on the precoders associated with each of the reflective elements 530, by modifying a precoder configuration used by the RIS, by transitioning from a first precoder configuration to a second precoder configuration, or any combination thereof.

In addition to angle of reflection (used interchangeably herein with "direction"), the RIS may be capable of modifying the phase of a reflected RF signal. The phase of the reflected RF signal may be controlled by the reflective elements 530 and may be specified by the reflective matrix. The phase of a reflected RF signal can be modified without modifying the direction of the reflected RF signal if the relative phase of each of the reflective elements 530 (relative to each other) is held constant. For example, a first RF signal can be transmitted with a phase of 0 radians and a second RF signal can be transmitted with a phase of π radians if the collective phase of the reflective elements 530 is modified to reflect the second RF signal with the phase of π radians (so long as the phases of the reflective elements 530 relative to each other are held constant). This difference in phase can be used to communicate information via a reflected RF signal, as described in more detail elsewhere herein. One or more of the above types of information (e.g., precoder configuration, precoder, precoder matrix, reflective matrix, etc.) may be referred to herein as a set of parameters, "phase information," or a phase configuration.

The assisting node 520 may control the reflective elements 530 of the assisting device 510. In some aspects, a controller (which may be implemented in the same device as the assisting node 520, or may be separate from the assisting node 520) may control the assisting device 510. For example, the assisting node 520 may select the reflective matrix used to configure the reflective elements 530. Additionally, the assisting node 520 may apply a set of parameters associated with each reflective element 530, as specified by the reflective matrix, to the reflective elements 530. For example, the assisting node 520 may configure an orientation of a reflective element 530, a resistance and/or reactance of the reflective element 530, or the like. The assisting node 520 may select a reflective matrix based at least in part on a timeline. For example, the assisting node 520 may receive configuration information indicating a time at which a particular reflective matrix is to be used or indicating a time at which a reflective matrix is to be modified.

The assisting node 520 may include an antenna 540. For example, the assisting node 520 may include one or more components of an RF chain. In some aspects, the assisting node 520 may be a UE (e.g., communicating on the radio access link or the sidelink). In some aspects, the assisting node may be a base station, a gNB, an access point, a roadside unit, or the like. The antenna 540 may enable communication with the base station 110 and/or the UE 120, such as via a radio access link or via a sidelink. For example, the base station 110 may provide configuration information (such as radio resource control (RRC) signaling, medium access control (MAC) signaling, control information, or the like) to the assisting node 520 via the radio access link. In some aspects, the configuration information may indicate a reflective matrix to be applied at a certain time or in accordance with a timeline.

The assisting node 520 may include a memory and one or more processors. The memory may be a non-transitory computer readable medium storing one or more instructions (e.g., code and/or program code) for wireless communications. For example, the one or more instructions, when executed (e.g., directly, or after compiling, converting, and/or interpreting) by the assisting node 520, may cause the assisting node 520 to perform or direct operations of, for example, processes as described herein. In some examples, executing instructions may include running the instructions, converting the instructions, compiling the instructions, and/or interpreting the instructions, among other examples.

As indicated above, FIG. 5 is provided as an example. Other examples may differ from what is described with regard to FIG. 5.

Figure 6:
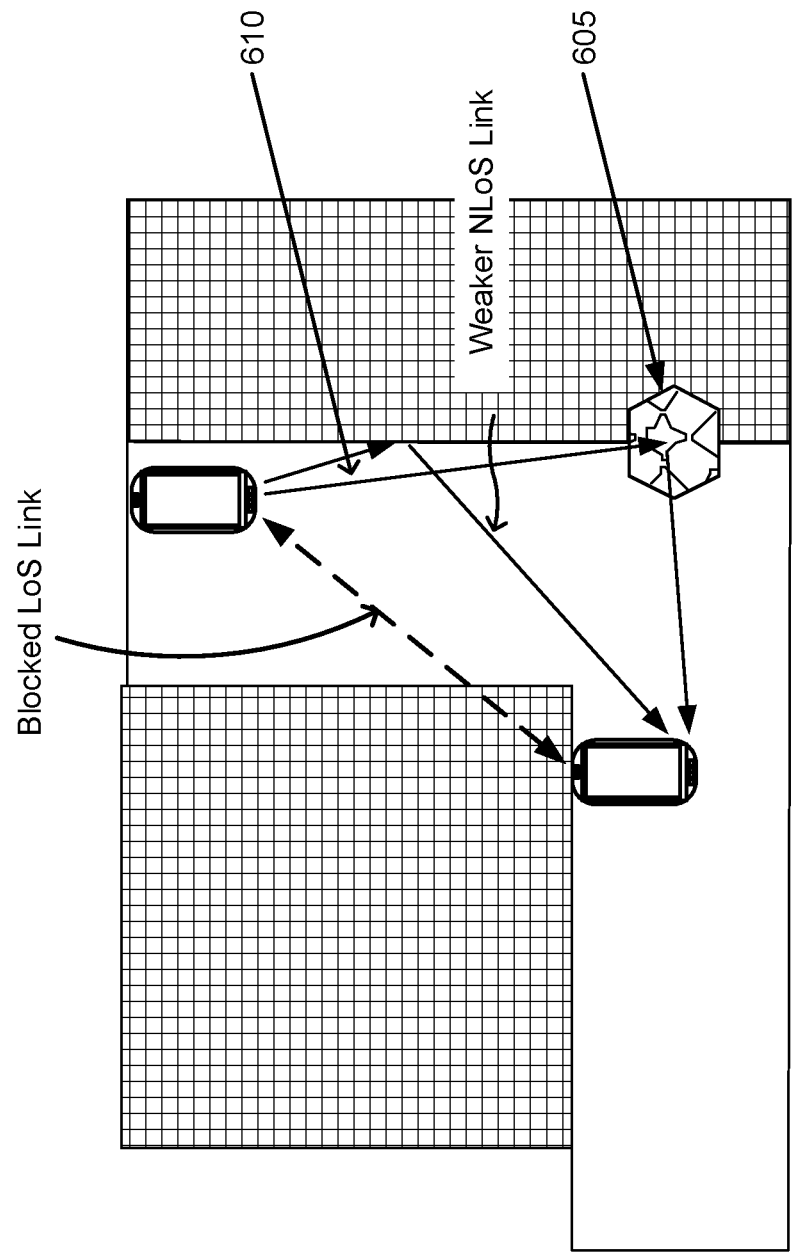
FIG. 6 is a diagram illustrating an example of assisting sidelink communications using an assisting device, in accordance with the present disclosure.

FIG. 6 is a diagram illustrating an example 600 of assisting sidelink communications using an assisting device, in accordance with the present disclosure. Example 600 includes a first UE, a second UE, and an assisting device 605. The first UE and the second UE may be sidelink UEs. The assisting device 605 may include assisting device 510. In some aspects, the assisting device 605 may be associated with an assisting node (e.g., assisting node 520). For example, the assisting device 605 may be associated with a wireless communication device including the assisting node, or the assisting node and the assisting device 605 may be parts of a wireless communication device.

As described above, sidelink UEs may communicate directly with one another, such as based at least in part on scheduling by a base station (e.g., in Mode 1 resource allocation) or using resource reservation managed by the sidelink UEs (e.g., in Mode 2 resource allocation). Conditions on the sidelink may change more rapidly than conditions on the uplink or the downlink (e.g., the Uu link). As examples, relative motion between vehicles, changes in the environment due to motion, or the like, may cause changes in sidelink channel conditions.

It may be beneficial for an assisting device to provide assistance (e.g., relaying, passive reflection, signal boosting, etc.) for sidelink UEs. For example, a sidelink connection may benefit from the presence of an assisting device in the network. As an example, received power for a non-line of sight (NLoS) link, such as shown by reference number 610, may be represented by $P_{Rx}=|h_{NLoS}|^2|s|^2$, where h represents the channel and s represents the transmitted signal. With an assisting device present, the signal may be boosted as $P_{Rx} \approx (|h_{NLoS}|^2+|h_{RIS}|^2)|s|^2$. However, for this boosting to take place, the assisting device needs to be controlled accurately to have constructive interference at the receiver, which boosts signal quality. Similar arguments may be made for beamforming used at a repeater. The base station may not have adequate information, regarding sidelink UEs, to properly configure the assisting device to provide constructive interference. Without such information, it may be difficult or impossible for the assisting device to provide consistently constructive interference, which leads to diminished throughput, suboptimal sidelink performance, and suboptimal utilization of the assisting device.

Some techniques and apparatuses described herein provide configuration and signaling for an assisting device providing assistance for a sidelink connection. For example, a base station may configure one or more sidelink UEs to report information regarding sidelink link quality. The base station may identify an assisting node that may provide assistance for the one or more sidelink UEs. The base station may configure the assisting node to provide assistance for the one or more sidelink UEs, such as based at least in part on training of the assisting node or an assisting device, indicating for the sidelink UE and the assisting node to handle the training or signaling associated with the training, or the like. As used herein, providing assistance for a sidelink communication may include directing (e.g., reflecting, relaying retransmitting, phasing, or the like), or causing an assisting device to direct, signals transmitted by a sidelink UE and associated with the sidelink communication. In this way, assistance from an assisting device and/or an associated assisting node may be provided for sidelink UEs, which may improve throughput, sidelink performance, and utilization of the assisting device.

As indicated above, FIG. 6 is provided as an example. Other examples may differ from what is described with regard to FIG. 6.

Figure 7:
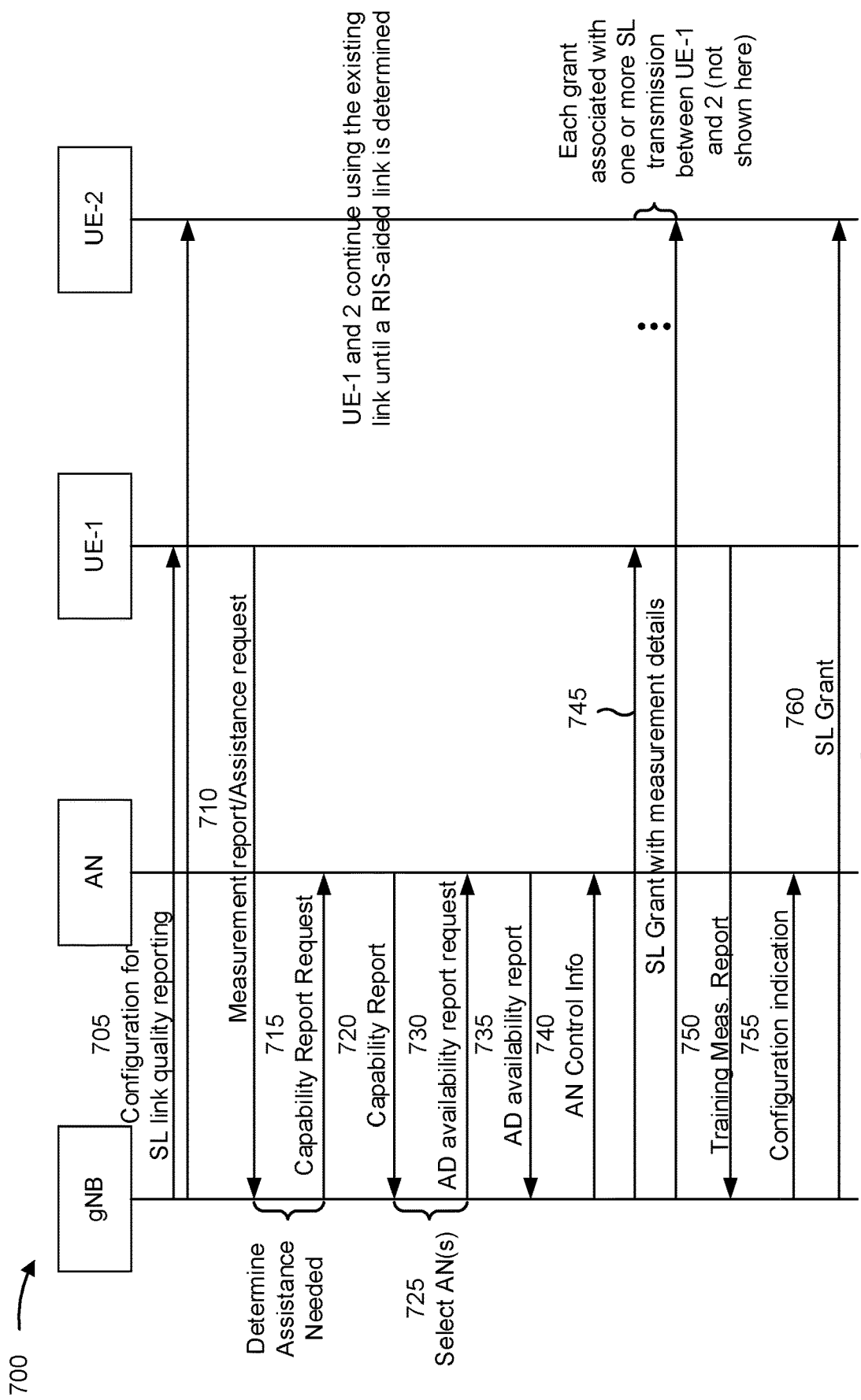
FIG. 7 is a diagram illustrating an example of signaling associated with providing assistance to sidelink UEs, in accordance with the present disclosure.

FIG. 7 is a diagram illustrating an example 700 of signaling associated with providing assistance to sidelink UEs, in accordance with the present disclosure. As shown, example 700 includes a base station (gNB) (e.g., base station 110), an assisting node (AN) associated with an assisting device (e.g., the assisting system 140 of FIG. 1, the assisting node 520 and assisting device 510 of FIG. 5, a wireless communication device, or the like), a first UE (UE-1) (e.g., UE 120, UE 305, UE 405, UE 410), and a second UE (UE-2) (e.g., UE 120, UE 305, UE 405, UE 410).

In example 700, the first UE and the second UE have an established sidelink unicast link which may have degraded over time. The first UE and the second UE may communicate using Mode 1 resource selection (e.g., base station scheduled resource selection). The base station may not control the assisting device directly. However, the base station may control or configure the assisting device via communication to the assisting node. The assisting node may or may not have sidelink capability.

As shown by reference number 705, in some aspects, the base station may configure the first UE and/or the second UE to report sidelink link quality. In some aspects, the first UE and/or the second UE may be preconfigured to report sidelink link quality. As shown by reference number 710, the first UE and/or the second UE may transmit a measurement report based at least in part on the sidelink unicast link quality. For example, the first UE and/or the second UE may transmit a measurement report for the sidelink unicast link periodically. In some aspects, the first UE and/or the second UE may transmit a measurement report and/or an indication based at least in part on the sidelink unicast link quality failing to satisfy a threshold. The indication may indicate that the sidelink unicast link quality fails to satisfy the threshold. In some aspects, the sidelink unicast link quality may be based at least in part on a reference signal received power (RSRP), a reference signal received quality (RSRQ), an estimate of signal to interference plus noise ratio (SINR), a combination thereof, and/or other metrics. The threshold may be a threshold RSRP, a threshold RSRQ, a threshold SINR, a combination thereof, or the like. In some aspects, the indication or the measurement report may indicate that assistance is needed to maintain a threshold sidelink unicast link quality.

In some aspects, a UE (e.g., the first UE or the second UE) may transmit information indicating one or more assisting nodes. For example, the UE may transmit the information indicating the one or more assisting nodes with the measurement report, with the indication, or separate from the measurement report and the indication. In some aspects, the one or more assisting nodes may be within a threshold distance of the UE. In some aspects, the one or more assisting nodes may have indicated, to the UE, that the one or more assisting nodes can provide assistance (e.g., based at least in part on one or more assisting devices). In some aspects, the UE may identify the one or more assisting nodes based at least in part on sidelink signaling, such as ProSe signaling or another form of signaling (e.g., associated with another application).

In some aspects, a UE (e.g., the first UE or the second UE) may provide information indicating a location of the first UE and/or the second UE. For example, the first UE may provide information indicating a location of the first UE and/or the second UE. In some aspects, the UE may provide information indicating trajectory information of the first UE and/or the second UE, such as a speed value, a direction value, or the like.

As shown by reference number 715, the base station may request a capability report from an assisting node. For example, the base station may request the capability report based at least in part on determining that assistance is needed (e.g., based at least in part on the measurement report shown by reference number 710) with regard to the sidelink unicast link between the first UE and the second UE. The request may include a request for assisting device information associated with one or more assisting devices that are associated with (e.g., controlled by) the assisting node. For example, the assisting device information may include information indicating a type of assisting device (e.g., RIS, repeater, relay, etc.), a band of operation associated with the assisting device, a quasi-colocation relation with a transmit receive point, or the like. As shown by reference number 720, the assisting node may transmit the capability report. For example, the capability report may include the assisting device information. In some aspects, as shown, the first UE and the second UE may continue to use the sidelink unicast link until a RIS-aided link is determined (e.g., until an appropriate assisting device is selected).

As shown by reference number 725, base station may identify the assisting node to provide assistance for the sidelink unicast link between the first UE and the second UE. In some aspects, the base station may identify the assisting node based at least in part on capability reports received prior to determining that the first UE is associated with the assistance condition. In some other aspects, the base station May determine that no assisting device is known to be present (such as based at least in part on not having received capability reporting indicating the presence of an assisting device), and may transmit the capability report request shown by reference number 715 to identify an assisting device. For example, the base station may transmit the capability report request to all assisting nodes (e.g., UEs) in a cell provided by the base station, or to a set of assisting nodes (e.g., UEs). In some aspects, the measurement report or indication from the first UE may indicate a set of assisting nodes associated with assisting devices. In some aspects, the base station may request a capability report from the set of assisting nodes indicated by the measurement report or the indication. In some aspects, if a selected assisting node is not connected to the base station, the base station may page the assisting node.

As shown by reference number 730, the base station may transmit, to the selected assisting node, a request for an assisting device availability report. As shown by reference number 735, the assisting node may transmit an assisting device availability report based at least in part on the request. In some aspects, the base station may establish a connection with the assisting device (e.g., prior to transmitting the request shown by reference number 730). The assisting device availability report may indicate availability of the assisting device associated with the assisting node. For example, the assisting device availability report may indicate one or more time resources (e.g., slots) in which the assisting device is available within a time window (e.g., within the next T seconds). In some aspects, the assisting device availability report may indicate one or more link directions over which the assisting device can be used. For example, the one or more link directions may be based at least in part on location information, such as geographical coordinates, a zone identifier, or the like. In some aspects, the one or more link directions may be associated with one or more time windows. In some aspects, the assisting device availability report may indicate a quasi-colocation (QCL) relationship between the assisting device and the assisting node (e.g., a transmit receive point of the assisting node). The base station may determine whether the assisting device can provide assistance for the sidelink unicast link based at least in part on the QCL relationship.

As shown by reference number 740, the base station may transmit assisting node control information to the assisting node (e.g., based at least in part on the assisting device availability report). The assisting node control information may request to reserve the assisting device in one or more future time resources (e.g., slots, time windows). In some aspects, the assisting node control information may be transmitted via downlink control information (DCI), such as with an assisting node indication. In some aspects, the assisting node control information may be transmitted via an RRC message. In some aspects, the assisting node control information may be referred to as information associated with training or configuring an assisting device.

In some aspects, the assisting node control information may indicate one or more time resources (e.g., slots, transmission time intervals, subframes, time windows, etc.) over which the assisting device will be used for assistance associated with the sidelink unicast link (e.g., associated with a particular assistance session for the sidelink unicast link). In some aspects, the assisting node control information may indicate, for a time resource, whether the time resource is used for transmission (e.g., for data communication via the sidelink unicast link with assistance of the assisting device) or training of the assisting device (e.g., for determination of configuration parameters for use by the assisting device). For instance, if the assisting device is being reserved for slots $[t_0, t_1, t_2, \ldots t_n]$, then the base station may allocate $[t_1, t_l]$ for training. In some aspects, the assisting node control information may include information associated with efficient training of the training device (such as based at least in part on location information available at the base station). For example, based at least in part on the location information available at the base station, the base station may indicate one or more directions for training of the assisting device. The location information may indicate one or more locations (e.g., of the assisting device, of the first UE, of the second UE, or a combination thereof).

In some aspects, the base station may transmit (e.g., via the assisting node control information) information indicating the locations or positions of the first UE and the second UE, and may notify the assisting node to determine a configuration for the assisting device. In some other aspects, the base station may indicate, to the assisting node, to use connection information of the assisting node to determine or refine control parameters for the assisting device (which may be referred to as transfer learning). In such examples, the base station may include a UE identifier in the assisting node control information (such as a Layer 2 identifier, for example) and may provide sidelink grants for link establishment between the assisting node, the first UE, and/or the second UE (if needed). In this example, the assisting node may determine the control parameters for the assisting device by, for instance, forming links with the first UE and/or the second UE, by decoding control information from the first UE and the second UE and using the control information to determine location information, or by communicating a set of configurations between the assisting node, the first UE, and/or the second UE (e.g., via the links with the first UE and/or the second UE), as described below. Thus, the assisting node may determine a parameter for training or configuring the assisting device (e.g., a control parameter) based at least in part on a connection (e.g., a link) between the assisting node and one or more of the first UE and the second UE. In some aspects, the assisting node may determine the control parameters based at least in part on current links with the first UE and/or the second UE and/or based at least in part on transmissions that the assisting node has received from the first UE and/or the second UE (which may be for a different application than the assistance).

In some aspects, the assisting node control information may indicate a periodicity associated with reservations (e.g., measurement or refinement reservations) for the assisting device. The periodicity may be used to reserve the assisting device for future time windows. For example, the periodicity may indicate a length of time between transmissions and measurements of reference signals for training the assisting device, or may indicate a length of time between reserved resources for transmission or measurement of reference signals for training the assisting device.

The assisting node may receive the assisting node control information from the base station. The assisting node may determine that the assisting node control information does not conflict with other received assisting node control information. In some aspects, as mentioned above, the assisting node control information indicates that the assisting node should perform transfer learning based configuration of the assisting device based at least in part on a link establishment with the first UE and/or the second UE. In such examples, the assisting node may wait for reception of a sidelink grant from the base station with resources for link establishment. The assisting node may discover, and establish a connection with, the first UE and/or the second UE based at least in part on a UE identifier indicated by the base station. The assisting node, the first UE, and/or the second UE may determine a set of configurations through which to cycle in a training period indicated by the base station.

In some aspects, as mentioned above, the assisting node control information indicates that the assisting node should perform transfer learning based configuration of the assisting device without link establishment. In such examples, the assisting node may determine a set of configurations through which to cycle in a training period indicated by the base station, based at least in part on information available to the assisting node, if the assisting node has communicated with the first UE and/or the second UE in the past. If the assisting node has not communicated with the first UE and/or the second UE in the past, the assisting node may wait for a length of time (e.g., a time window) to decode control information (e.g., sidelink control information) from the first UE and/or the second UE to determine the set of configurations. For example, the assisting node may determine the set of configurations based at least in part on the control information.

In some aspects, the assisting node may determine that a reservation of an assisting device conflicts with a past reservation. In this case, the assisting node may select a reservation, of multiple conflicting reservations, to prioritize. For example, if the multiple reservations are from the same base station, the assisting node may prioritize (e.g., honor) a most recently received reservation. Thus, the assisting node may select the reservation based at least in part on respective times at which a first reservation and a second reservation were received. If the multiple reservations are from different base stations, the assisting node may prioritize a reservation from a primary base station, such as a base station associated with a cell on which the assisting node is camped, a primary base station for multiple connectivity, or the like. Thus, the assisting node may select the reservation based at least in part on respective base stations from which the first reservation and second reservation were received. If one of the multiple reservations is from a sidelink UE, then the assisting node may prioritize reservations by base stations over the reservation from the sidelink UE. Thus, the assisting node may select the reservation based at least in part on whether the first reservation or the second reservation was received from the base station or from a sidelink UE.

In some aspects, the base station may reserve the assisting device. For example, the base station may transmit a reservation for the assisting device in one or more time windows. The reservation may be based at least in part on information associated with training or configuring the assisting device. For example, the information may indicate one or more time windows in which the assisting device can be reserved.

As shown by reference number 745, in some aspects, the base station may transmit a sidelink grant to the first UE and/or the second UE. In some aspects, the sidelink grant may be associated with training of the assisting device. For example, the sidelink grant may indicate one or more reference signals to be transmitted by the first UE and/or the second UE for training of the assisting device during one or more training occasions. In some aspects, the sidelink grant may also schedule a data communication between the first UE and the second UE. The base station may configure the first UE and/or the second UE to transmit a measurement report or a link quality report to the base station in association with each training occasion. The first UE and/or the second UE may transmit the measurement report, as shown by reference number 750.

In some aspects, the base station may request for the first UE and/or the second UE to pause data communication. In this case, the sidelink grant may be used only for training of the assisting device (e.g., using the one or more reference signals). A transmitting UE (of the first UE or the second UE), when scheduling a transmission using SCI, may indicate to a receiving UE that the transmission is associated with training of the assisting device. In such examples, the receiving UE may skip data decoding, and may only perform channel measurements based at least in part on the SCI. The transmitting UE may transmit measurement reporting to the base station based at least in part on the channel measurements, as shown by reference number 750.

As shown by reference number 755, the base station may transmit a configuration indication to the assisting node. The configuration indication may indicate a configuration for the assisting device, or may include information that the assisting node may use to determine the configuration. The configuration may be based at least in part on the measurement reporting shown by reference number 750, which is associated with the training of the assisting device. In some aspects, the base station may indicate a slot (e.g., a training occasion) associated with a highest measurement (e.g., RSRP, RSRQ, SINR). The assisting node may map the slot to a configuration of the assisting device that was used in the slot, and may use the configuration to provide assistance on the sidelink unicast link. For example, the assisting node may use the configuration for the reserved slots $[t_{l+1}, t_n]$ (as mentioned above) or until the next training occasion as indicated by the base station.

As shown by reference number 760, the base station may configure the first UE and/or the second UE to report sidelink measurements to the base station (e.g., such that the base station can evaluate whether the assistance is successful or is still needed). If the first UE and/or the second UE are already configured to report sidelink measurements, then the base station may alter a reporting frequency or a reporting criterion associated with the sidelink measurement reporting.

As indicated above, FIG. 7 is provided as an example. Other examples may differ from what is described with regard to FIG. 7.

Figure 8:
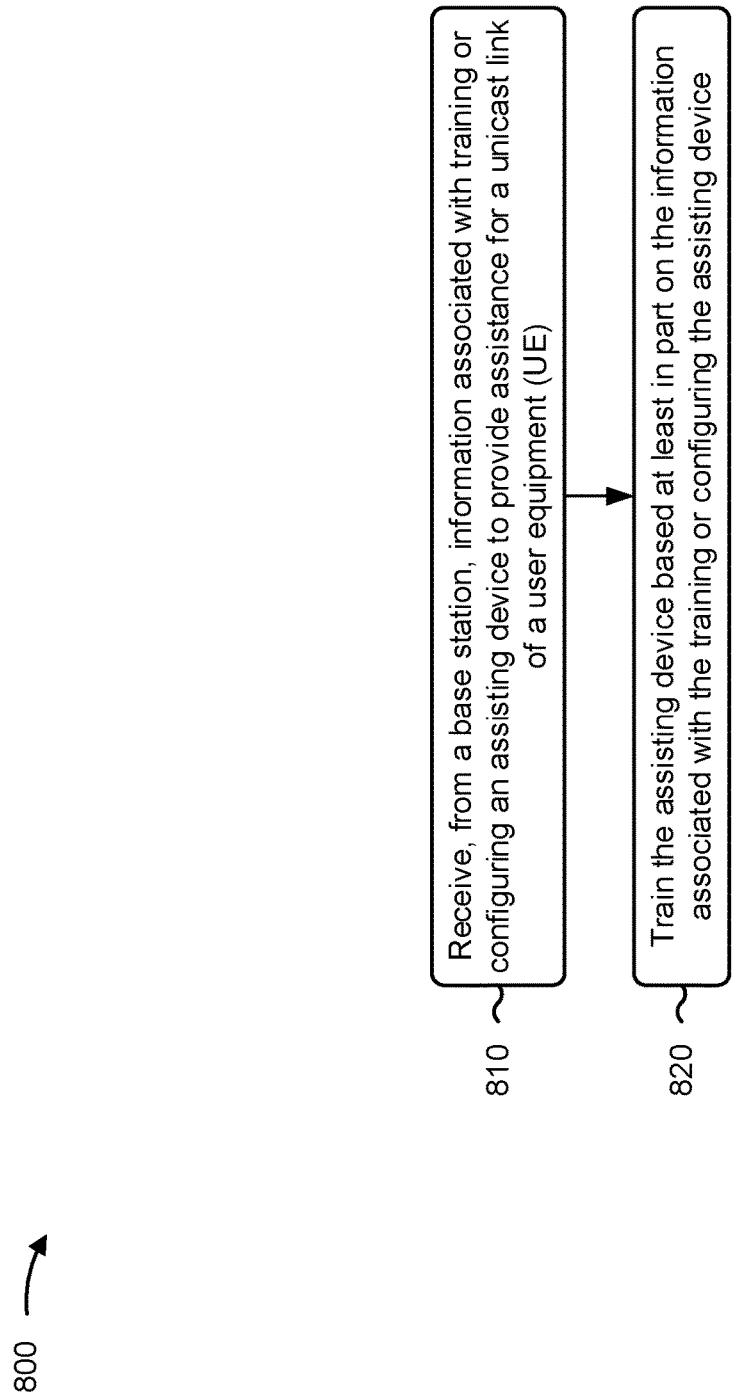
FIGS. 8-9 are diagrams illustrating example processes associated with providing assistance to sidelink UEs, in accordance with the present disclosure.

FIG. 8 is a diagram illustrating an example process 800 performed, for example, by a wireless communication device, in accordance with the present disclosure. Example process 800 is an example where the wireless communication device (e.g., assisting system 140, an assisting node 520 of assisting system 140, or the like) performs operations associated with sidelink communication using assisting device.

As shown in FIG. 8, in some aspects, process 800 may include receiving, from a base station, information associated with training or configuring an assisting device to provide assistance for a unicast link of a user equipment (UE) (block 810). For example, the wireless communication device (e.g., using communication manager 150 and/or reception component 1002, depicted in FIG. 10) may receive, from a base station, information associated with training or configuring an assisting device to provide assistance for a unicast link of a user equipment (UE), as described above.

As further shown in FIG. 8, in some aspects, process 800 may include training the assisting device based at least in part on the information associated with the training or configuring the assisting device (block 820). For example, the wireless communication device (e.g., using communication manager 150 and/or training component 1008, depicted in FIG. 10) may train the assisting device based at least in part on the information associated with the training or configuring the assisting device, as described above.

Process 800 may include additional aspects, such as any single aspect or any combination of aspects described below and/or in connection with one or more other processes described elsewhere herein.

In a first aspect, the wireless communication device includes the assisting device, and wherein the assisting device includes at least one of a relay, a repeater, or a reconfigurable intelligent surface.

In a second aspect, alone or in combination with the first aspect, process 800 includes receiving, from the base station based at least in part on a measurement report associated with the training of the assisting device, information indicating a selected configuration for the assisting device.

In a third aspect, alone or in combination with one or more of the first and second aspects, process 800 includes receiving, from the base station, a request for capability information associated with the wireless communication device, and transmitting a response to the request indicating the capability information.

In a fourth aspect, alone or in combination with one or more of the first through third aspects, the response is transmitted before receiving the information associated with training or configuring the assisting device.

In a fifth aspect, alone or in combination with one or more of the first through fourth aspects, the request is transmitted after receiving the information associated with training or configuring the assisting device.

In a sixth aspect, alone or in combination with one or more of the first through fifth aspects, process 800 includes transmitting, to the base station prior to receiving the information associated with training or configuring the assisting device, information regarding availability of the assisting device for the assistance.

In a seventh aspect, alone or in combination with one or more of the first through sixth aspects, the information regarding the availability of the assisting device indicates at least one of a time window in which the assisting device is available, or a link direction associated with the assisting device for the time window.

In an eighth aspect, alone or in combination with one or more of the first through seventh aspects, the information associated with training or configuring the assisting device includes at least one of a reservation for the assisting device in one or more time windows, an indication of whether the one or more time windows are for data communication or for training of the assisting device, one or more directions for training of the assisting device, a location associated with the UE or another UE associated with the unicast link, an indication for the wireless communication device to determine a parameter for training or configuring the assisting device based at least in part on a connection between the wireless communication device and the UE, or a periodicity associated with the reservation.

In a ninth aspect, alone or in combination with one or more of the first through eighth aspects, process 800 includes establishing, based at least in part on the information associated with training or configuring the assisting device, a connection with the UE, wherein training the assisting device is based at least in part on a set of configurations communicated via the connection.

In a tenth aspect, alone or in combination with one or more of the first through ninth aspects, training the assisting device is based at least in part on a set of configurations communicated with the UE prior to receiving the information associated with training or configuring the assisting device.

In an eleventh aspect, alone or in combination with one or more of the first through tenth aspects, training the assisting device is based at least in part on a set of configurations received from the UE after a time window has elapsed.

In a twelfth aspect, alone or in combination with one or more of the first through eleventh aspects, a first reservation indicated by the information associated with training or configuring the assisting device conflicts with a second reservation, and wherein the method further comprises selecting a reservation, of the first reservation and the second reservation, to prioritize based at least in part on at least one of respective times at which the first reservation and the second reservation were received, respective base stations from which the first reservation and the second reservation were received, or whether the first reservation or the second reservation was received from the base station or from a sidelink UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
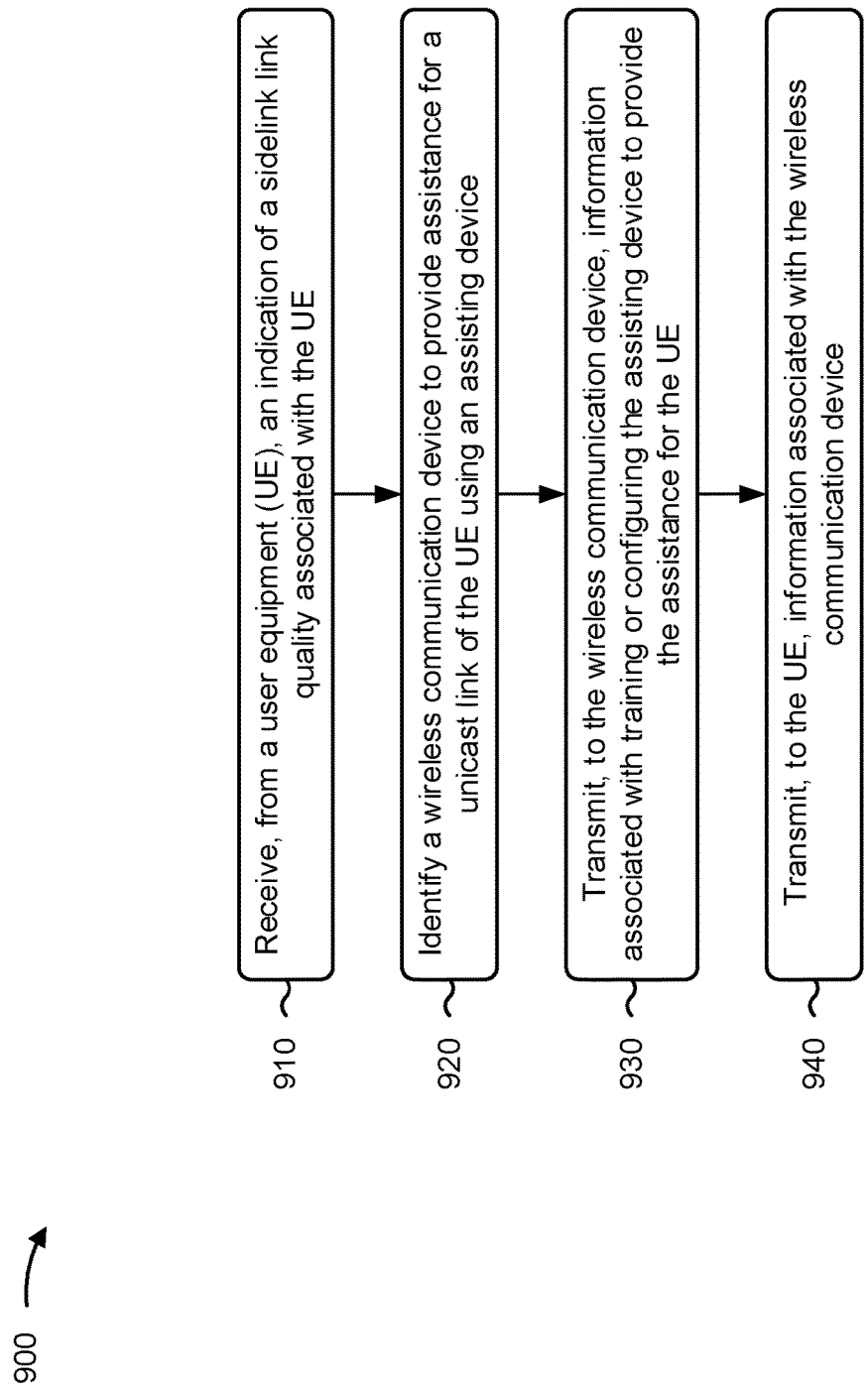

FIG. 9 is a diagram illustrating an example process 900 performed, for example, by a base station, in accordance with the present disclosure. Example process 900 is an example where the base station (e.g., base station 110) performs operations associated with sidelink communication using assisting device.

As shown in FIG. 9, in some aspects, process 900 may include receiving, from a user equipment (UE), an indication of a sidelink link quality associated with the UE (block 910). For example, the base station (e.g., using communication manager 150 and/or reception component 1104, depicted in FIG. 11) may receive, from a user equipment (UE), an indication of a sidelink link quality associated with the UE, as described above.

As further shown in FIG. 9, in some aspects, process 900 may include identifying a wireless communication device to provide assistance for a unicast link of the UE using an assisting device (block 920). For example, the base station (e.g., using communication manager 150 and/or identification component 1108, depicted in FIG. 11) may identify a wireless communication device to provide assistance for a unicast link of the UE using an assisting device, as described above.

As further shown in FIG. 9, in some aspects, process 900 may include transmitting, to the wireless communication device, information associated with training or configuring the assisting device to provide the assistance for the UE (block 930). For example, the base station (e.g., using communication manager 150 and/or transmission component 1104, depicted in FIG. 11) may transmit, to the wireless communication device, information associated with training or configuring the assisting device to provide the assistance for the UE, as described above.

As further shown in FIG. 9, in some aspects, process 900 may include transmitting, to the UE, information associated with the wireless communication device (block 940). For example, the base station (e.g., using communication manager 150 and/or transmission component 1104, depicted in FIG. 11) may transmit, to the UE, information associated with the wireless communication device, as described above.

Process 900 may include additional aspects, such as any single aspect or any combination of aspects described below and/or in connection with one or more other processes described elsewhere herein.

In a first aspect, the assisting device includes at least one of a relay, a repeater, or a reconfigurable intelligent surface.

In a second aspect, alone or in combination with the first aspect, process 900 includes transmitting, to the UE, configuration information to cause the UE to transmit the indication.

In a third aspect, alone or in combination with one or more of the first and second aspects, process 900 includes transmitting, to the wireless communication device based at least in part on a measurement report from the UE, information indicating a selected configuration for the assisting device, wherein the measurement report is associated with the training or configuration of the assisting device.

In a fourth aspect, alone or in combination with one or more of the first through third aspects, the indication of the sidelink link quality is based at least in part on at least one of a periodic configuration, or a threshold for a measurement.

In a fifth aspect, alone or in combination with one or more of the first through fourth aspects, the indication of the sidelink link quality includes information identifying one or more wireless communication devices associated with the UE.

In a sixth aspect, alone or in combination with one or more of the first through fifth aspects, the indication of the sidelink link quality includes location information for the UE or another UE associated with the unicast link.

In a seventh aspect, alone or in combination with one or more of the first through sixth aspects, process 900 includes transmitting, to the wireless communication device, a request for capability information associated with the wireless communication device, wherein identifying the wireless communication device is based at least in part on a response to the request.

In an eighth aspect, alone or in combination with one or more of the first through seventh aspects, the request is transmitted before receiving the indication of the sidelink link quality.

In a ninth aspect, alone or in combination with one or more of the first through eighth aspects, the request is transmitted after receiving the indication of the sidelink link quality.

In a tenth aspect, alone or in combination with one or more of the first through ninth aspects, process 900 includes receiving, from the wireless communication device prior to transmitting the information associated with training or configuring the assisting device, information regarding availability of the assisting device for the assistance.

In an eleventh aspect, alone or in combination with one or more of the first through tenth aspects, the information regarding the availability of the assisting device indicates at least one of a time window in which the assisting device is available, or a link direction associated with the assisting device for the time window.

In a twelfth aspect, alone or in combination with one or more of the first through eleventh aspects, the information associated with training or configuring the assisting device includes at least one of a reservation for the assisting device in one or more time windows, an indication of whether the one or more time windows are for data communication or for training of the assisting device, one or more directions for training of the assisting device, a location associated with the UE or another UE associated with the unicast link, an indication for the wireless communication device to determine a parameter for training or configuring the assisting device based at least in part on a connection between the wireless communication device and the UE, or a periodicity associated with the reservation.

In a thirteenth aspect, alone or in combination with one or more of the first through twelfth aspects, process 900 includes transmitting, to the UE, a grant for data communication during training of the assisting device.

In a fourteenth aspect, alone or in combination with one or more of the first through thirteenth aspects, the grant or the information associated with training or configuring the assisting device indicates one or more reference signals to be transmitted in connection with training the assisting device.

In a fifteenth aspect, alone or in combination with one or more of the first through fourteenth aspects, process 900 includes transmitting, to the UE, an indication to pause data communication and a grant for reference signaling associated with training the assisting device.

In a sixteenth aspect, alone or in combination with one or more of the first through fifteenth aspects, process 900 includes transmitting, to the wireless communication device based at least in part on the training of the assisting device, a configuration for the assisting device.

In a seventeenth aspect, alone or in combination with one or more of the first through sixteenth aspects, process 900 includes transmitting, to the UE, a configuration for sidelink measurement reporting based at least in part on the configuration for the assisting device.

In an eighteenth aspect, alone or in combination with one or more of the first through seventeenth aspects, the unicast link is a sidelink unicast link with another UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
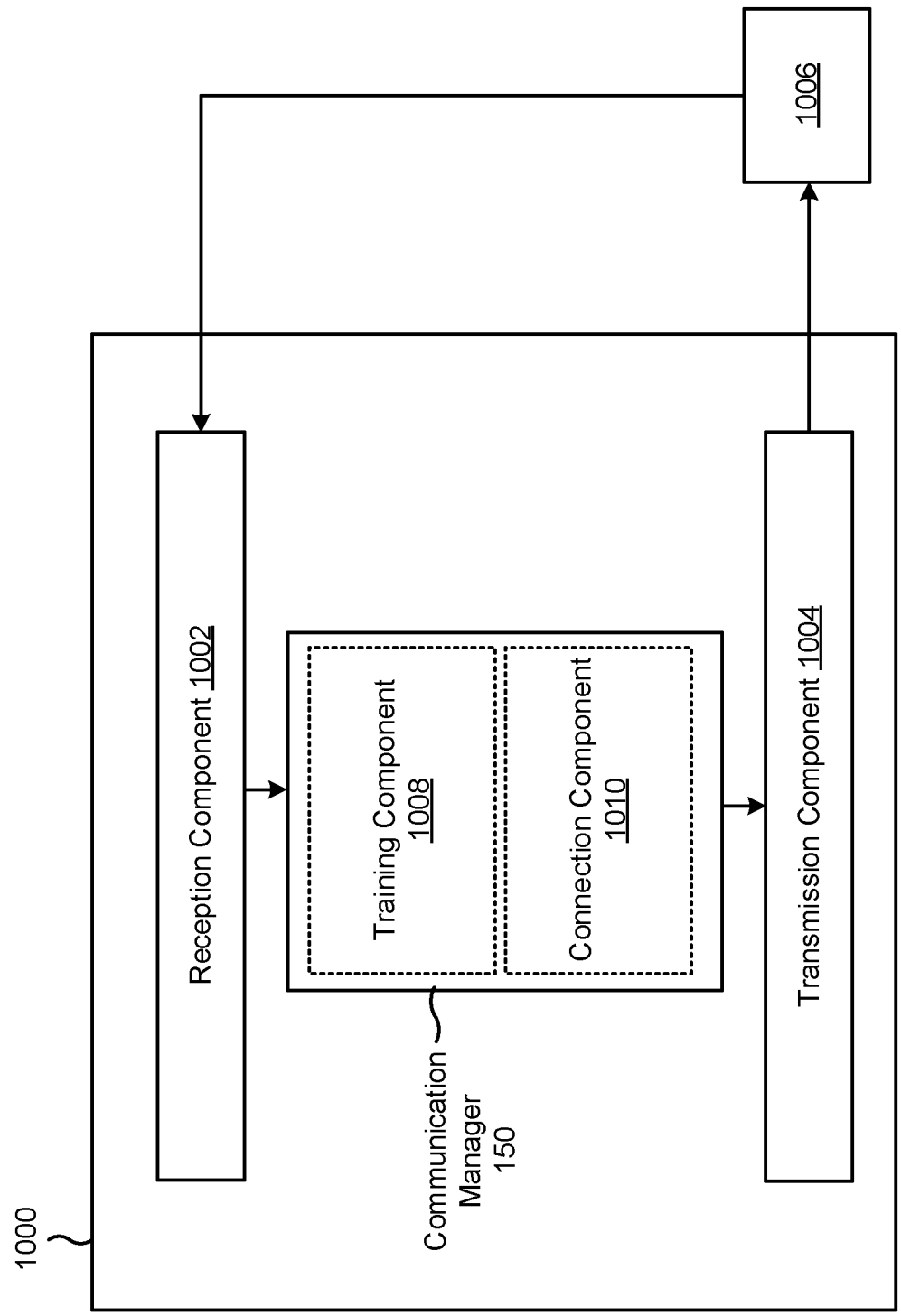
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a wireless communication device, or a wireless communication device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a training component 1008 and/or a connection component 1010, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the wireless communication device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the wireless communication device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the wireless communication device described in connection with FIG. 2. In some aspects, the transmission component 1004 may be co-located with the reception component 1002 in a transceiver.

The reception component 1002 may receive, from a base station, information associated with training or configuring an assisting device to provide assistance for a unicast link of a user equipment (UE). The training component 1008 may train the assisting device based at least in part on the information associated with the training or configuring the assisting device.

The reception component 1002 may receive, from the base station based at least in part on a measurement report associated with the training of the assisting device, information indicating a selected configuration for the assisting device.

The reception component 1002 may receive, from the base station, a request for capability information associated with the wireless communication device transmitting a response to the request indicating the capability information.

The transmission component 1004 may transmit, to the base station prior to receiving the information associated with training or configuring the assisting device, information regarding availability of the assisting device for the assistance.

The connection component 1010 may establish, based at least in part on the information associated with training or configuring the assisting device, a connection with the UE, wherein training the assisting device is based at least in part on a set of configurations communicated via the connection.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
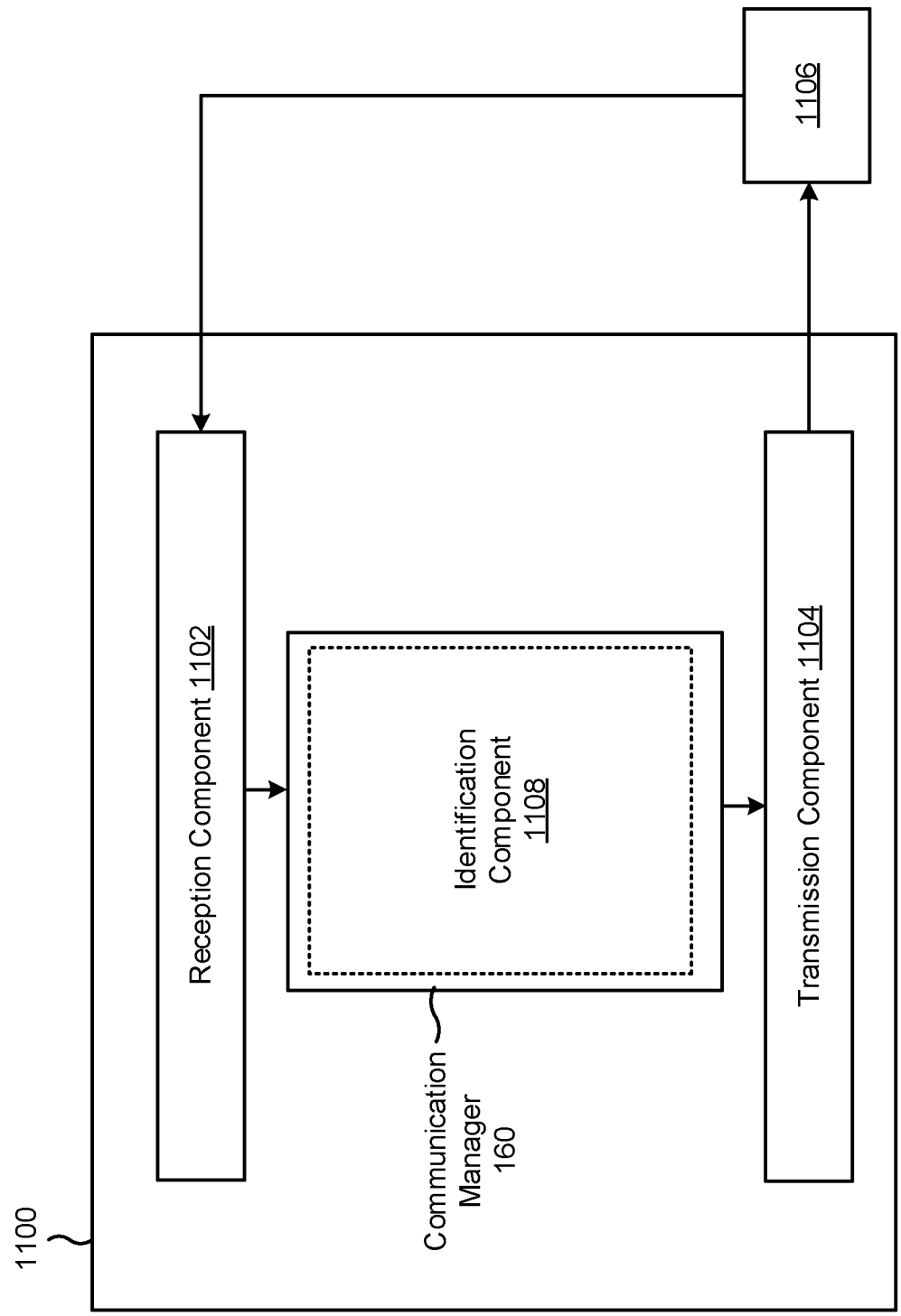

FIG. 11 is a diagram of an example apparatus 1100 for wireless communication, in accordance with the present disclosure. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 160. The communication manager 160 may include an identification component 1108, among other examples.

In some aspects, the apparatus 1100 may be configured to perform one or more operations described herein in connection with FIGS. 3-7. Additionally, or alternatively, the apparatus 1100 may be configured to perform one or more processes described herein, such as process 1000 of FIG. 10, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The reception component 1102 may receive, from a user equipment (UE), an indication of a sidelink link quality associated with the UE. The identification component 1108 may identify a wireless communication device to provide assistance for a unicast link of the UE using an assisting device. The transmission component 1104 may transmit, to the wireless communication device, information associated with training or configuring the assisting device to provide the assistance for the UE. The transmission component 1104 may transmit, to the UE, information associated with the wireless communication device.

The transmission component 1104 may transmit, to the UE, configuration information to cause the UE to transmit the indication.

The transmission component 1104 may transmit, to the wireless communication device based at least in part on a measurement report from the UE, information indicating a selected configuration for the assisting device, wherein the measurement report is associated with the training or configuration of the assisting device.

The transmission component 1104 may transmit, to the wireless communication device, a request for capability information associated with the wireless communication device, wherein identifying the wireless communication device is based at least in part on a response to the request.

The reception component 1102 may receive, from the wireless communication device prior to transmitting the information associated with training or configuring the assisting device, information regarding availability of the assisting device for the assistance.

The transmission component 1104 may transmit, to the UE, a grant for data communication during training of the assisting device.

The transmission component 1104 may transmit, to the UE, an indication to pause data communication and a grant for reference signaling associated with training the assisting device.

The transmission component 1104 may transmit, to the wireless communication device based at least in part on the training of the assisting device, a configuration for the assisting device.

The transmission component 1104 may transmit, to the UE, a configuration for sidelink measurement reporting based at least in part on the configuration for the assisting device.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a wireless communication device, comprising: receiving, from a base station, information associated with training or configuring an assisting device to provide assistance for a unicast link of a user equipment (UE); and training the assisting device based at least in part on the information associated with the training or configuring the assisting device.

Aspect 2: The method of Aspect 1, wherein the wireless communication device includes the assisting device, and wherein the assisting device includes at least one of: a relay, a repeater, or a reconfigurable intelligent surface.

Aspect 3: The method of any of Aspects 1-2, further comprising receiving, from the base station based at least in part on a measurement report associated with the training of the assisting device, information indicating a selected configuration for the assisting device.

Aspect 4: The method of any of Aspects 1-3, further comprising receiving, from the base station, a request for capability information associated with the wireless communication device; and transmitting a response to the request indicating the capability information.

Aspect 5: The method of Aspect 4, wherein the response is transmitted before receiving the information associated with training or configuring the assisting device.

Aspect 6: The method of Aspect 4, wherein the request is transmitted after receiving the information associated with training or configuring the assisting device.

Aspect 7: The method of any of Aspects 1-6, further comprising transmitting, to the base station prior to receiving the information associated with training or configuring the assisting device, information regarding availability of the assisting device for the assistance.

Aspect 8: The method of Aspect 7, wherein the information regarding the availability of the assisting device indicates at least one of: a time window in which the assisting device is available, or a link direction associated with the assisting device for the time window Aspect 9: The method of any of Aspects 1-8, wherein the information associated with training or configuring the assisting device includes at least one of: a reservation for the assisting device in one or more time windows, an indication of whether the one or more time windows are for data communication or for training of the assisting device, one or more directions for training of the assisting device, a location associated with the UE or another UE associated with the unicast link, an indication for the wireless communication device to determine a parameter for training or configuring the assisting device based at least in part on a connection between the wireless communication device and the UE, or a periodicity associated with the reservation.

Aspect 10: The method of any of Aspects 1-9, further comprising establishing, based at least in part on the information associated with training or configuring the assisting device, a connection with the UE, wherein training the assisting device is based at least in part on a set of configurations communicated via the connection.

Aspect 11: The method of any of Aspects 1-10, wherein training the assisting device is based at least in part on a set of configurations communicated with the UE prior to receiving the information associated with training or configuring the assisting device.

Aspect 12: The method of any of Aspects 1-11, wherein training the assisting device is based at least in part on a set of configurations received from the UE after a time window has elapsed.

Aspect 13: The method of any of Aspects 1-12, wherein a first reservation indicated by the information associated with training or configuring the assisting device conflicts with a second reservation, and wherein the method further comprises: selecting a reservation, of the first reservation and the second reservation, to prioritize based at least in part on at least one of: respective times at which the first reservation and the second reservation were received, respective base stations from which the first reservation and the second reservation were received, or whether the first reservation or the second reservation was received from the base station or from a sidelink UE.

Aspect 14: A method of wireless communication performed by a base station, comprising: receiving, from a user equipment (UE), an indication of a sidelink link quality associated with the UE; identifying a wireless communication device to provide assistance for a unicast link of the UE using an assisting device; transmitting, to the wireless communication device, information associated with training or configuring the assisting device to provide the assistance for the UE; and transmitting, to the UE, information associated with the wireless communication device.

Aspect 15: The method of Aspect 14, wherein the assisting device includes at least one of: a relay, a repeater, or a reconfigurable intelligent surface.

Aspect 16: The method of any of Aspects 14-15, further comprising transmitting, to the UE, configuration information to cause the UE to transmit the indication.

Aspect 17: The method of any of Aspects 14-16, further comprising transmitting, to the wireless communication device based at least in part on a measurement report from the UE, information indicating a selected configuration for the assisting device, wherein the measurement report is associated with the training or configuration of the assisting device.

Aspect 18: The method of any of Aspects 14-17, wherein the indication of the sidelink link quality is based at least in part on at least one of: a periodic configuration, or a threshold for a measurement.

Aspect 19: The method of any of Aspects 14-18, wherein the indication of the sidelink link quality includes information identifying one or more wireless communication devices associated with the UE.

Aspect 20: The method of any of Aspects 14-19, wherein the indication of the sidelink link quality includes location information for the UE or another UE associated with the unicast link.

Aspect 21: The method of any of Aspects 14-20, further comprising transmitting, to the wireless communication device, a request for capability information associated with the wireless communication device, wherein identifying the wireless communication device is based at least in part on a response to the request.

Aspect 22: The method of Aspect 21, wherein the request is transmitted before receiving the indication of the sidelink link quality.

Aspect 23: The method of Aspect 21, wherein the request is transmitted after receiving the indication of the sidelink link quality.

Aspect 24: The method of any of Aspects 14-23, further comprising receiving, from the wireless communication device prior to transmitting the information associated with training or configuring the assisting device, information regarding availability of the assisting device for the assistance.

Aspect 25: The method of Aspect 24, wherein the information regarding the availability of the assisting device indicates at least one of: a time window in which the assisting device is available, or a link direction associated with the assisting device for the time window.

Aspect 26: The method of any of Aspects 14-25, wherein the information associated with training or configuring the assisting device includes at least one of: a reservation for the assisting device in one or more time windows, an indication of whether the one or more time windows are for data communication or for training of the assisting device, one or more directions for training of the assisting device, a location associated with the UE or another UE associated with the unicast link, an indication for the wireless communication device to determine a parameter for training or configuring the assisting device based at least in part on a connection between the wireless communication device and the UE, or a periodicity associated with the reservation.

Aspect 27: The method of any of Aspects 14-26, further comprising transmitting, to the UE, a grant for data communication during training of the assisting device.

Aspect 28: The method of Aspect 27, wherein the grant or the information associated with training or configuring the assisting device indicates one or more reference signals to be transmitted in connection with training the assisting device.

Aspect 29: The method of any of Aspects 14-28, further comprising transmitting, to the UE, an indication to pause data communication and a grant for reference signaling associated with training the assisting device.

Aspect 30: The method of any of Aspects 14-29, further comprising transmitting, to the wireless communication device based at least in part on the training of the assisting device, a configuration for the assisting device.

Aspect 31: The method of Aspect 30, further comprising transmitting, to the UE, a configuration for sidelink measurement reporting based at least in part on the configuration for the assisting device.

Aspect 32: The method of any of Aspects 14-31, wherein the unicast link is a sidelink unicast link with another UE.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
    receiving, from a base station, information associated with training or configuring an assisting device to provide assistance for a unicast link of a user equipment (UE), wherein the information associated with training or configuring the assisting device includes at least one of:
        information indicating a reservation for the assisting device in one or more time windows,
        an indication of whether the one or more time windows are for data communication or for training of the assisting device,
        one or more directions for training of the assisting device,
        a location associated with the UE or another UE associated with the unicast link,
        an indication for the wireless communication device to determine a parameter for training or configuring the assisting device based at least in part on a connection between the wireless communication device and the UE, or
        a periodicity associated with the reservation; and
    training the assisting device based at least in part on the information associated with the training or configuring the assisting device.

2. The method of claim 1, wherein the wireless communication device includes the assisting device, and wherein the assisting device includes at least one of:
    a relay,
    a repeater, or
    a reconfigurable intelligent surface.

3. The method of claim 1, further comprising receiving, from the base station based at least in part on a measurement report associated with the training of the assisting device, information indicating a selected configuration for the assisting device.

4. The method of claim 1, further comprising receiving, from the base station, a request for capability information associated with the wireless communication device; and
    transmitting a response to the request indicating the capability information.

5. The method of claim 4, wherein the response is transmitted before receiving the information associated with training or configuring the assisting device.

6. The method of claim 4, wherein the request is transmitted after receiving the information associated with training or configuring the assisting device.

7. The method of claim 1, further comprising transmitting, to the base station prior to receiving the information associated with training or configuring the assisting device, information regarding availability of the assisting device for the assistance.

8. The method of claim 7, wherein the information regarding the availability of the assisting device indicates at least one of:
    a time window in which the assisting device is available, or
    a link direction associated with the assisting device for the time window.

9. The method of claim 1, further comprising establishing, based at least in part on the information associated with training or configuring the assisting device, a connection with the UE, wherein training the assisting device is based at least in part on a set of configurations communicated via the connection.

10. The method of claim 1, wherein training the assisting device is based at least in part on a set of configurations communicated with the UE prior to receiving the information associated with training or configuring the assisting device.

11. The method of claim 1, wherein training the assisting device is based at least in part on a set of configurations received from the UE after a time window has elapsed.

12. The method of claim 1, wherein a first reservation indicated by the information associated with training or configuring the assisting device conflicts with a second reservation, and wherein the method further comprises:
    selecting a reservation, of the first reservation and the second reservation, to prioritize based at least in part on at least one of:
        respective times at which the first reservation and the second reservation were received,
        respective base stations from which the first reservation and the second reservation were received, or
        whether the first reservation or the second reservation was received from the base station or from a sidelink UE.

13. A method of wireless communication performed by a base station, comprising:
    receiving, from a user equipment (UE), an indication of a sidelink link quality associated with the UE;
    identifying a wireless communication device to provide assistance for a unicast link of the UE using an assisting device;
    transmitting, to the wireless communication device, information associated with training or configuring the assisting device to provide the assistance for the UE, wherein the information associated with training or configuring the assisting device includes at least one of:
- a reservation for the assisting device in one or more time windows,
- an indication of whether the one or more time windows are for data communication or for training of the assisting device,
- one or more directions for training of the assisting device,
- a location associated with the UE or another UE associated with the unicast link,
- an indication for the wireless communication device to determine a parameter for training or configuring the assisting device based at least in part on a connection between the wireless communication device and the UE, or
- a periodicity associated with the reservation; and transmitting, to the UE, information associated with the wireless communication device.

14. The method of claim 13, wherein the assisting device includes at least one of:
- a relay,
- a repeater, or
- a reconfigurable intelligent surface.

15. The method of claim 13, further comprising transmitting, to the UE, configuration information to cause the UE to transmit the indication.

16. The method of claim 13, further comprising transmitting, to the wireless communication device based at least in part on a measurement report from the UE, information indicating a selected configuration for the assisting device, wherein the measurement report is associated with the training or configuration of the assisting device.

17. The method of claim 13, wherein the indication of the sidelink link quality is based at least in part on at least one of:
- a periodic configuration, or
- a threshold for a measurement.

18. The method of claim 13, wherein the indication of the sidelink link quality includes information identifying one or more wireless communication devices associated with the UE.

19. The method of claim 13, wherein the indication of the sidelink link quality includes location information for the UE or another UE associated with the unicast link.

20. The method of claim 13, further comprising transmitting, to the wireless communication device, a request for capability information associated with the wireless communication device, wherein identifying the wireless communication device is based at least in part on a response to the request.

21. The method of claim 20, wherein the request is transmitted before receiving the indication of the sidelink link quality.

22. The method of claim 20, wherein the request is transmitted after receiving the indication of the sidelink link quality.

23. The method of claim 13, further comprising receiving, from the wireless communication device prior to transmitting the information associated with training or configuring the assisting device, information regarding availability of the assisting device for the assistance.

24. The method of claim 23, wherein the information regarding the availability of the assisting device indicates at least one of:
- a time window in which the assisting device is available, or
- a link direction associated with the assisting device for the time window.

25. The method of claim 13, further comprising transmitting, to the UE, a grant for data communication during training of the assisting device.

26. The method of claim 25, wherein the grant or the information associated with training or configuring the assisting device indicates one or more reference signals to be transmitted in connection with training the assisting device.

27. The method of claim 13, further comprising transmitting, to the UE, an indication to pause data communication and a grant for reference signaling associated with training the assisting device.

28. A wireless communication device for wireless communication, comprising:
or more memories; and
one or more processors, coupled to the one or more memories, the one or more processors configured to:
receive, from a base station, information associated with training or configuring an assisting device to provide assistance for a unicast link of a user equipment (UE), wherein the information associated with training or configuring the assisting device includes at least one of:
- a reservation for the assisting device in one or more time windows,
- an indication of whether the one or more time windows are for data communication or for training of the assisting device,
- one or more directions for training of the assisting device,
- a location associated with the UE or another UE associated with the unicast link,
- an indication for the wireless communication device to determine a parameter for training or configuring the assisting device based at least in part on a connection between the wireless communication device and the UE, or
- a periodicity associated with the reservation; and
train the assisting device based at least in part on the information associated with the training or configuring the assisting device.

* * * * *